(12) United States Patent
Loose et al.

(10) Patent No.: US 12,043,391 B2
(45) Date of Patent: Jul. 23, 2024

(54) SECURING ARRANGEMENT FOR A COMPONENT TO BE SECURED IN RAILS OF A FLOOR STRUCTURE OF AN AIRCRAFT INTERIOR

(71) Applicant: Lufthansa Technik AG, Hamburg (DE)

(72) Inventors: Joern Loose, Hamburg (DE); Mario Gamm, Reinbek (DE); Wolfram Kuhlgatz, Hardebek (DE); Stefan Koehler, Elmshorn (DE); Pawel Piotrowski, Berlin (DE); Magdalena Schmitz, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 1617 days.

(21) Appl. No.: 15/774,643

(22) PCT Filed: Nov. 10, 2016

(86) PCT No.: PCT/EP2016/077218
§ 371 (c)(1),
(2) Date: May 9, 2018

(87) PCT Pub. No.: WO2017/081128
PCT Pub. Date: May 18, 2017

(65) Prior Publication Data
US 2018/0327097 A1 Nov. 15, 2018

(30) Foreign Application Priority Data
Nov. 11, 2015 (DE) ...................... 10 2015 222 233.0
May 25, 2016 (CH) ...................... 00671/16

(51) Int. Cl.
*F16B 5/02* (2006.01)
*B64C 1/20* (2006.01)
*B64D 11/06* (2006.01)

(52) U.S. Cl.
CPC ............ *B64D 11/0696* (2013.01); *B64C 1/20* (2013.01); *F16B 5/0225* (2013.01); *F16B 5/025* (2013.01)

(58) Field of Classification Search
CPC ................. B64D 11/0696; B64C 1/20; Y10T 403/32131; Y10T 403/32155;
(Continued)

(56) References Cited

U.S. PATENT DOCUMENTS 4,501,404 A * 2/1985 Nelson ................... B64D 11/06
248/503.1
5,058,829 A * 10/1991 Bentley .............. B64D 11/0696
244/122 R
(Continued)

FOREIGN PATENT DOCUMENTS

CN 103708036 A 4/2014
CN 203753410 U 8/2014
(Continued)

*Primary Examiner* — Michael P Ferguson
*Assistant Examiner* — Zachary A Hall
(74) *Attorney, Agent, or Firm* — LEYDIG, VOIT & MAYER, LTD.

(57) ABSTRACT

A securing device for a component that can be secured on rails of a floor structure of an aircraft interior includes at least two adapter plates. The adapter plates are decoupled from one another and configured to be secured on the rails. The adapter plates being configured to secure the component having mutually spaced securing attachments.

13 Claims, 4 Drawing Sheets

(58) Field of Classification Search
CPC ..... Y10T 403/32196; Y10T 403/32426; Y10T 403/32442; Y10T 403/32451; Y10T 403/32459
USPC .............................................. 410/77, 80, 105
See application file for complete search history.

(56) References Cited

U.S. PATENT DOCUMENTS

| | | | | |
|---|---|---|---|---|
| 5,083,726 | A * | 1/1992 | Schurr | B64D 11/0696 244/118.6 |
| 5,236,153 | A * | 8/1993 | LaConte | B60P 7/0815 244/118.6 |
| 5,392,693 | A * | 2/1995 | Engel | F04B 1/124 92/172 |
| 5,904,407 | A | 5/1999 | Larson et al. | |
| 6,659,402 | B1 | 12/2003 | Prochaska | |
| 7,618,009 | B2 * | 11/2009 | Glockler | H05K 7/1412 244/118.6 |
| 7,857,259 | B2 * | 12/2010 | Baatz | B64C 1/20 244/118.6 |
| 8,763,972 | B2 * | 7/2014 | Turschel | B65D 19/06 248/346.03 |
| 8,870,119 | B2 * | 10/2014 | Baatz | B64C 1/20 244/118.6 |
| 8,910,914 | B2 * | 12/2014 | Bigeh | H04R 1/08 403/114 |
| 9,481,467 | B2 * | 11/2016 | Oleson | B64C 1/20 244/118.1 |
| 10,618,658 | B2 * | 4/2020 | Thomaschewski | B64D 11/0696 |
| 2005/0072897 | A1 * | 4/2005 | Fanucci | B63B 29/06 248/680 |
| 2005/0211833 | A1 * | 9/2005 | Frantz | B64C 1/20 244/118.1 |
| 2007/0080258 | A1 | 4/2007 | Baatz et al. | |
| 2010/0314494 | A1 | 12/2010 | Gasser et al. | |
| 2014/0097662 | A1 | 4/2014 | Köhn et al. | |
| 2015/0042136 | A1 | 2/2015 | Rajasingham et al. | |
| 2015/0108273 | A1 | 4/2015 | Oleson | |
| 2015/0115101 | A1 | 4/2015 | Thomaschewski | |

FOREIGN PATENT DOCUMENTS

| | | | |
|---|---|---|---|
| CN | 104093608 A | 10/2014 | |
| WO | 2013174518 A1 | 11/2013 | |
| WO | WO 2013/174518 | * 11/2013 | ......... B64D 11/0696 |

* cited by examiner

SECURING ARRANGEMENT FOR A COMPONENT TO BE SECURED IN RAILS OF A FLOOR STRUCTURE OF AN AIRCRAFT INTERIOR

CROSS-REFERENCE TO PRIOR APPLICATIONS

National Phase

This application is a U.S. National Stage Application under 35 U.S.C. § 371 of International Application No. PCT/EP2016/077218 filed on Nov. 10, 2016, and claims benefit to German Patent Application No. DE 10 2015 222 233.0 filed on Nov. 11, 2015 and Swiss Patent Application No. CH 00671/16 filed on May 25, 2016. The International Application was published in German on May 18, 2017, as WO 2017/081128 A1 under PCT Article 21(2).

FIELD

The invention relates to a securing device for a component to be secured on rails of a floor structure of an aircraft interior.

BACKGROUND

In an aircraft interior, aircraft seats can be secured on rails of a rail system. The rails can be arranged on a floor structure of the aircraft interior.

Various requirements with respect to aviation regulations are drafted by the relevant authorities for safe use of an aircraft seat in air transport operations, the compliance with which requirements is intended to ensure the safety of the passenger in the aircraft seat in various situations or potential accident scenarios.

In the event of a crash, it is required that a passenger sitting in the aircraft seat is not subjected to dynamic forces that exceed specific limit values under defined conditions. For this purpose, it is necessary for the aircraft seat to be able to absorb kinetic energy in order to limit the forces exerted on the passenger. The seat substructure of conventional aircraft seats therefore comprises a metal structure that plastically deforms in the event of a crash, consequently absorbing kinetic energy and thus limiting the forces exerted on the passenger.

The plastic deformation takes place in this case in a distributed manner over the entire seat substructure. This means that the mechanical structures that bear the load are deformed and thus the forces exerted on the passenger are limited. The fact that deformation also leads to an altered geometry and force guidance must be taken into account in the design of the aircraft seat by corresponding structural reserves. The inventors have recognized that this has a disadvantageous effect on the weight of the aircraft seat.

In the case of a translational crash event, the deformation leads to, inter alia, a rotational movement of a large proportion of the seat about a virtual point of rotation close to the cabin floor. On account of the position of the resultant virtual point of rotation, this leads to a significant translational movement in the upper region of the seat, which movement occurs in addition to the translational movement required to absorb energy. In the event of a crash, this therefore leads to a large envelope of motion for the aircraft seat and consequently also for the occupant, which envelope must be kept free as movement room for further installations.

Using a simple structural reinforcement for the seat substructure in order to reduce rotation in the case of translational crash events is an obstacle for the safety requirement of force limitation on the passenger.

In particular, it is an official aircraft seat requirement that, in the event of a crash, the aircraft floor should assume a predeformation that must be assumed or borne by the seat substructure. The seat substructures have to therefore be mechanically compliant particularly in the lower region in order to be able to follow the deflections in the aircraft floor structure. This contrasts with a low rotational movement of the aircraft seat and with the desired small envelope of motion. Seat substructures having rigid structures that only permit little deformation can therefore not be realised by traditional solutions.

Furthermore, the predeformation of the floor structure causes deformation of the seat substructure together with large strains and an altered geometry, and this leads to a weakening of the seat substructure, the actual crash event having high dynamic loads only occurring thereafter.

WO 2013/174518 A1 has proposed a floor linking assembly as a securing device, which comprises at least three securing points in the rails of a floor structure of an aircraft for mechanically linking an aircraft seat, the floor linking assembly being securable at at least three securing points to a securing element on the floor structure in each case. The floor linking assembly also includes an adapter plate that has a mechanical connection between the adapter plate and the securing elements, which plate is mounted in a substantially torque-free manner about at least one axis.

The adapter plate used allows for the aircraft seats or the components in general to be positioned in the aircraft interior independently of the course and the arrangement of the rails, as a result of which the aircraft can be equipped accordingly with an individual arrangement of aircraft seats and components. The mounting of the adapter plate can also prevent deformations of the floor structure from being transferred to the adapter plate and the component to a certain degree.

Furthermore, a differential pressure between the aircraft interior and the environment arises when the aircraft ascends or descends which leads to a lateral expansion of the aircraft fuselage transversely to the rails that extend in the longitudinal direction of the aircraft fuselage and to a subsequent contraction of same. On account of the components secured to the floor structure by means of the adapter part of the floor linking assembly, the expansions lead to constraining forces in the floor structure, which forces in turn can lead to material fatigue of the floor structure, the rails and also the adapter plate in the case of a large number of ascents and descents, as a result of which the static load-bearing capacity of the components is in turn reduced.

SUMMARY

In an embodiment, the present invention provides a securing device for a component that can be secured on rails of a floor structure of an aircraft interior. The securing devices includes at least two adapter plates. The adapter plates are decoupled from one another and configured to be secured on the rails. The adapter plates being configured to secure the component having mutually spaced securing attachments.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
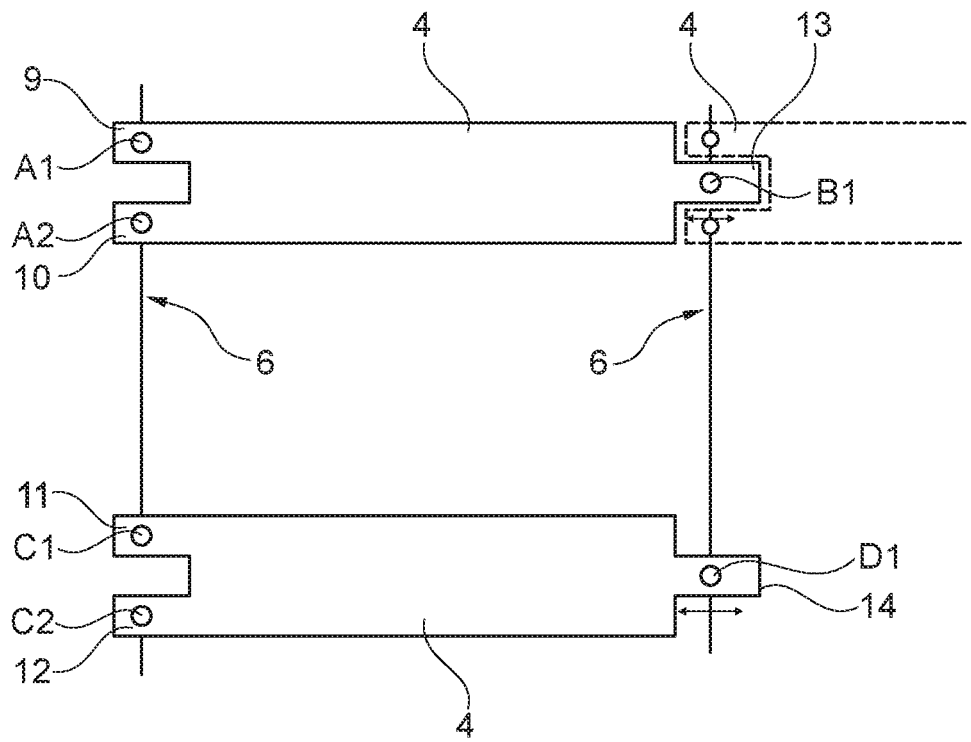
FIG. 1 shows a securing device having two adapter plates and two rails viewed from above.

Embodiments of the present invention provide a securing device that is intended for a component that can be secured on rails of a floor structure of an aircraft. Advantages of embodiments include that they reduce the above-described constraining forces and the resultant probability of damage in the event of deformations.

According to aspects of the invention, the securing device comprises at least two adapter plates, which are decoupled from one another and can be secured on the rails, on which plates the component having mutually spaced securing attachments can be secured.

Some advantages of the present invention are evident in the fact that the securing of the component is decoupled from the floor structure as a result. On account of the at least two adapter plates used, the floor structure of the aircraft is reinforced by a considerably smaller degree than is the case traditional solutions that use one single adapter plate, meaning that, on account of the unavoidable deformations of the aircraft floor, resultant constraining forces can be substantially reduced not only in the floor structure but also in the securing device and in the component to be secured. In this way, the at least two adapter plates, the mounting points of the adapter plates on the rails and finally also the arrangement of the securing attachments of the component on the adapter plates can be selected and positioned such that corresponding main deformation directions in particular are taken into account. As a result, the maximum constraining forces and the resultant maximum stresses exerted on the component in the floor structure, in the adapter plates and in the component itself can be particularly effectively reduced. Furthermore, particularly large components, e.g. pieces of furniture, are secured on the rails of the floor structure particularly simply and having very high stability by selecting the spacings between the adapter plates and the securing attachments on the component to be correspondingly large. In this case, it is of particular advantage to be able to use identical adapter plates for this purpose, irrespective of the shape and the size of the components. The individual orientation and position of the component in the aircraft interior can be achieved in this way by the individual shaping, orientation and securing of the adapter parts on the rails.

In embodiments, each of the adapter plates can be secured to two different rails, each adapter plate being mounted on one of the rails at a first mounting point and on the other rail at two second mounting points. As a result, the adapter plates are held in place on the rails at three mounting points; as a result of which the adapter plates can be secured on the rails such that they do not tilt. Since the three mounting points, irrespective of the position thereof, always span one plane, the adapter plates can be held in place at the mounting points with constraining forces that are as low as possible, in particular even in the event of deformations of the rails.

A particularly effective mounting with constraining forces that are as low as possible in the event of deformations can be achieved by the adapter plates being mounted at the first mounting points so as to be slidable with respect to the rails. A lateral stiffening of the floor structure can be avoided by these deliberately created floating bearings. The bearing points, at which the adapter plates are supported by only one bearing point, are deliberately designed so as to be slidable, as a result of which the slidability can be achieved particularly simply and with little effort. The slidability of the bearing point in this case is preferably transverse to the relevant rail. Since the rails extend in the longitudinal direction of the aircraft fuselage, a degree of freedom is created as a result, by means of which the slight radial expansion of the aircraft fuselage during the ascent of the aircraft due to increasing differential pressure can be compensated. As a result, in the case of deformation of the floor structure, the rails can move slightly relative to one another without constraining forces being generated in the adapter plates or the floor structure in the process.

It is furthermore proposed for at least one of the side faces of the adapter plate to be contoured in such a way that at least two adapter plates provided for securing different components can be arranged so as to be adjacent to one another on a common rail. Embodiments of the present invention provide that the adapter plates of adjacent components can be arranged so as to save as much installation space as possible.

According to embodiments, the side face of one of the two adapter plates is the negative face of the opposite side face of the adapter plate arranged adjacent thereto in each case and the two adapter plates mutually engage with the opposite side faces. Embodiments provide that the adapter plates of the different components can be arranged in a particularly space-saving manner by a form-fitting overlap of the side faces. Gaps can be deliberately provided between the side faces by e.g. a projecting portion on one of the side faces of an adapter plate in each case being smaller than a recessed portion, or offset with respect to a recessed portion, of an adjacent side face of another adapter plate, such that the adapter plates can move slightly relative to one another and are not braced against one another in the event of deformations.

According to embodiments, the two second mounting points of a first adapter plate are arranged on finger-shaped spaced apart projections, and a second adapter plate in each case comprises a first mounting point arranged on an individual finger-shaped projection, the first mounting point being supported on the same rail on the individual finger-shaped projection between the projections of the second mounting points of the first adapter plate. The two adapter plates engage with one another in a practically tooth-like manner, the slidable mounting point of the second adapter plate being arranged between the two fixed mounting points of the first adapter plate. Besides the particularly space-saving arrangement, an abutment is also created thereby for limiting any possible movement of the adapter plates relative to one another. Ideally, the adapter plates are designed so as to be identical and engage with the projection on which the floating bearing is arranged, between the two projections on which the adapter plates are supported on fixed bearings on the rails. As a result, a plurality of adapter plates having components supported thereon can be arranged in a row in a particularly space-saving manner.

In embodiments, ball-and-socket joints are provided in each connection between the component and the rails, preferably in each connection between the adapter parts and the rails. Degrees of freedom are deliberately introduced into the connections between the components and the rails and preferably into the connections between the adapter parts and the rails, by the ball-and-socket joints, in the form of rotational mobility, so that the component and preferably the adapter parts can perform certain pivotal movements relative to the rails and the floor structure, and vice versa, without constraining forces being generated in the components, the adapter plates or the floor structure in the process. This rotational mobility allows in particular slight rotational movements of the rails about the longitudinal axes thereof together with only very little or no constraining forces and stresses in the floor structure, the rails, the adapter plates and the component itself. Expansions of the floor structure and additionally torsions of same can be compensated within specific limits by the combination of the floating bearings with the rotational mobility.

Despite the pivotability, the bearing points can be designed to be sufficiently rigid by virtue of each ball-and-socket joint being formed by a dimensionally stable ball and a dimensionally stable ball socket, which are designed to be rigid and inflexible to such a degree that they can transfer the forces without mechanical damage and deformations. In order for the appropriately dimensionally stable bearing parts to be easily assembled, each ball socket is formed by two dimensionally stable ball socket halves. Embodiments of the present invention provide that the ball-and-socket joint formed by the dimensionally stable parts can be easily assembled by the ball first being placed into one of the dimensionally stable ball socket halves and the other ball socket half then being attached in order to complete the ball socket. In this way, none of the dimensionally stable bearing parts has to be deformed, meaning that the parts can be designed to correspond mechanically to the bearing forces to be absorbed, without having to take assembly into consideration in the process. The ball socket halves are preferably dimensioned such that the socket halves only begin to narrow from the insertion opening and therefore the ball socket halves in the mounted position only ever encompass a maximum of half of the ball.

The balls of the ball-and-socket joints are preferably associated with the rails and the socket halves are preferably associated with the adapter plates.

Furthermore, each of the two ball socket halves of a ball-and-socket joint is arranged on a support plate, which halves complement each other in an assembled position to form the ball socket and comprise at least one securing attachment. The two support plates therefore form the ball socket by means of the assembly, the securing attachments being used to connect the two support plates.

The floating bearing of the first mounting point can be realised in a particularly simple manner by virtue of the two support plates in the assembled position each being connected to an adapter plate by means of a tongue and groove joint, the tongue and groove joint being oriented transversely, preferably perpendicularly, to the rails to which the relevant adapter plate is secured by means of the first mounting point. By means of the tongue and groove joint, the adapter plate is guided on the floating bearing in the direction of the lateral freedom of movement with respect to the two support plates. Furthermore, the tongue and groove joint can also be deliberately designed as a frictional connection which is only released when a transverse force predetermined by the design is exceeded. As a result, the adapter plate can only be slid laterally with respect to the rail when a predetermined transverse force is exceeded, meaning that the possible constraining forces and stresses introduced into the floor structure and conversely into the adapter plate are only limited above a specific transverse force.

The tongue and groove joint can be realised and mounted in a particularly simple manner if the tongue is arranged on the adapter plate and the groove is formed by two shoulders that complement each other in the assembled position to form the groove, each shoulder being arranged on one of the support plates. The support plates having the ball socket halves can be mounted such that they are attached to the adapter plate on either side and are subsequently connected to one another, the ball being inserted in an intermediate step. After attachment, the two shoulders complement each other to form the groove, at the same time encompassing the tongue provided on the adapter plate on either side.

It is furthermore proposed for the two support plates to be supported on the adapter plate by means of two tongue and groove joints that are arranged on opposite lateral sides of the support plates, preferably lateral sides that extend in parallel with one another. Embodiments provide (e.g., for the purpose of adjustment), the support plates, or the adapter plates, that can be moved slightly in a lateral manner, prior to the final securing process of the two support plates, before they are finally secured. Furthermore, the lateral direction of movement of the adapter plate perpendicularly to the rail is predefined at the same time by the proposed orientation of the tongue and groove joint.

Instead of the ball-and-socket joints, a coupling piece which comprises two pairs of pivot pins in flush alignment can alternatively also be used. The coupling piece is connected to one of the adapter plates by means of one of the pairs of pivot pins and connected directly to the rails or to an intermediate piece fixed in relation to the rails by means of the other pair of pivot pins. The pivot pins can in this case also be formed by one continuous, integral pivot pin, instead of by two pairs.

The adapter plate can be mounted so as to be pivotable at each mounting point by means of the coupling piece about the pivot axes defined by the pivot pins, as a result of which a mounting can be achieved that is comparable in terms of properties with the ball-and-socket joints. For this purpose, the pivot pins are preferably oriented orthogonally with respect to one another, such that the pivot axes defined thereby are likewise oriented orthogonally with respect to one another. However, the use of the ball-and-socket joints has the advantage that the mountings at the mounting points are considerably flatter, meaning that correspondingly flat or thin adapter plates can be used, and a correspondingly low overall height of the entire securing device can be achieved. The ball-and-socket joints additionally have the advantage over the use of the coupling piece together with the two pivot axes that the balls can be freely pivoted and rotated in the ball socket halves within certain limits, whereas, when using the coupling pieces, movement of the adapter plates is only produced by a combination of two pivotal movements about the two pivot axes.

Therefore, for reasons of overall height and of mobility, the use of ball-and-socket joints is preferred.

The coupling piece can comprise, on the lower side thereof, two cut-outs by means of which the pivot pin facing the rail is exposed. Furthermore, the fitting part can comprise two upright domes each having one through-opening. In order to assemble the coupling piece, the coupling piece is attached to the fitting part such that the domes engage in the cut-outs and are oriented such that the through-openings in the domes are flush with corresponding through-openings in the coupling piece. Subsequently, the pivot pin is inserted through the flush openings in the coupling piece and the openings in the domes, as a result of which the coupling piece is pivotably connected to the fitting part and the rail. One pivot pin is oriented orthogonally with respect to the other pivot pin, such that the component supported on the coupling piece is mounted in the manner of a gimbal so as to be pivotable about the longitudinal axes of the pivot pins.

A securing device according to the invention having two adapter plates 4 can be seen in FIG. 1, which plates are supported on two rails 6 that are oriented so as to be parallel with one another and in the longitudinal direction of an aircraft fuselage. The rails 6 are part of a rail system arranged in the aircraft interior in the floor structure of the aircraft fuselage, in which system various components can be secured, e.g. aircraft seats, tables, pieces of general furniture, dividing walls and the like. In order to secure a component, the securing device according to the invention comprises two adapter plates 4 which are supported on the rails 6 so as to be spaced apart from one another. If larger components are to be secured on the rails 6, it goes without saying that further adapter plates 4 secured to the rails or to further rails 6 of the rail system can also be provided.

Figure 2:
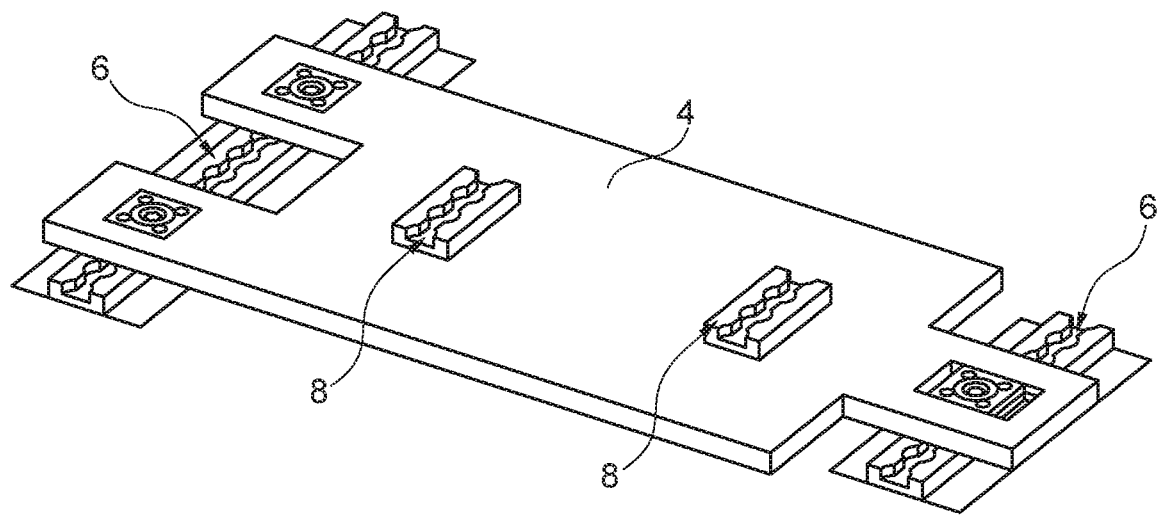
FIG. 2 shows an adapter plate having two rails.
Figure 3:
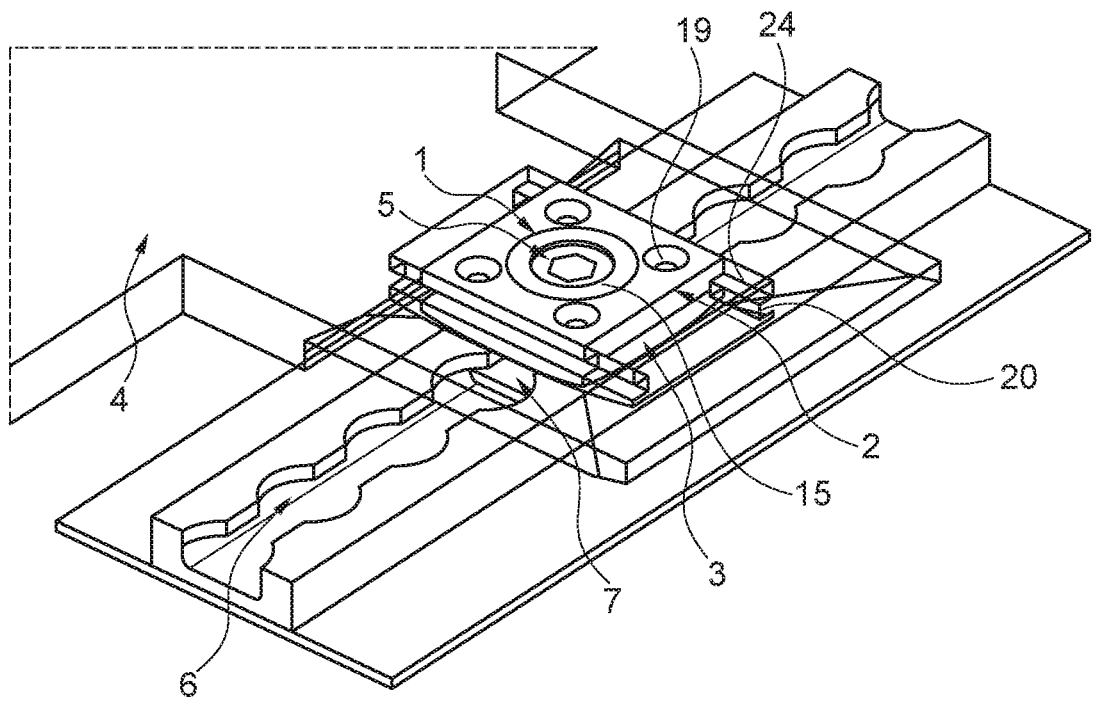
FIG. 3 shows an enlarged detail of an adapter plate having a ball-and-socket joint.
Figure 4:
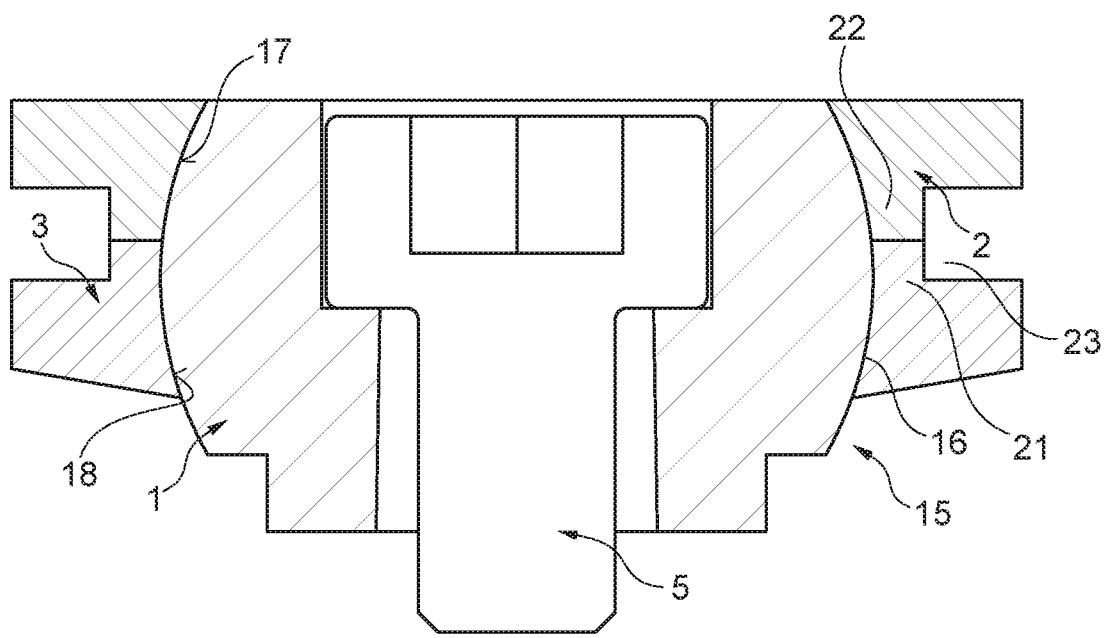
FIG. 4 shows a sectional representation of a cross section through the ball-and-socket joint.

An enlarged adapter plate 4 can be seen in oblique view in FIG. 2. Each of the rails 6 is designed as a U profile having a locking contour formed from uniformly arranged projecting portions, the projecting portions being formed in such a way that they cause the open sides of the U profile to narrow in order to form uniform circular openings having a central slot. The adapter plates 4 are each, respectively mounted at a first mounting point B1 (at an individual finger-shaped projection 13 of one adapter plate) and D1 (at an individual finger-shaped projection 14 of the other adapter plate) so as to be slidable transversely with respect to the rails 6 shown on the right-hand side of FIG. 1. Furthermore, the adapter plates 4 are each connected to the adjacent rail 6 at two second mounting points A1, A2 (respectively at two finger-shaped spaced apart projections 9 and 10 of one adapter plate) and C1, C2 (respectively at two finger-shaped spaced apart projections 11 and 12 of the other adapter plate) in a non-slidable manner, such that each of the adapter plates 4 is supported on a tilt-free three-point bearing having two bearings that cannot slide and one bearing that can slide. Since the slidability of the first mounting points B1 and D1 is directed transversely to the rail 6, as can also be seen in FIG. 1, the two rails 6 can move relative to one another, without constraining forces being generated in the process on the rails 6, the floor structure, the adapter plates 4 or on the components secured thereto.

On each of the adapter plates 4, two short securing pieces 8 are provided which are formed by shortened pieces of a rail 6 having an identical locking contour. The component is now secured on the securing pieces 8 of the adapter plate 4, instead of on the rails 6, directly by means of securing attachments arranged thereon. The position and the orientation of the component can therefore be individually predefined by the position and the orientation of the securing pieces 8, and the position and orientation of the securing pieces 8 can also be individually adapted to the position and orientation of the securing attachments of the component. The adapter plates 4 form in practice a constructive interface between the components and the rails 6, which allows an individual arrangement and orientation of the component with respect to the rails 6 of the rail system. Since embodiments of the invention provide for two adapter plates 4 that are decoupled from one another and secured on the rails 6 so as to be spaced apart, large components can also be secured to the floor structure without the floor structure having to be reinforced by a correspondingly large single adapter part 4 for this purpose, as would be the case in the traditional solutions. Rather, by using identical adapter parts 4 and by means of the individual arrangement, in particular the individual selection of the distance between the two adapter parts 4, components of different size can be secured on the rails 6 using identical adapter parts 4.

The adapter parts 4 themselves are each connected to the rails 6 by means of ball-and-socket joints 15 at the first and second mounting points A1, A2, B1, C1, C2 and D1. The ball-and-socket joints 15 each include a ball 1 which is connected by means of a securing screw 5 to a fitting part 7 that is locked in the rails 6. Furthermore, at each of the mounting points A1, A2, B1, C1, C2 and D1, two support plates 2 and 3 are provided on each adapter plate 4, each support plate having four securing attachments 19 in the form of bores that have or do not have an internal thread, by means of which the support plates 2 and 3 are interconnected by means of suitable securing screws. The support plates 2 and 3 comprise ball socket halves 17 and 18, respectively, which are shaped and arranged such that they complement each other to form a ball socket 16 when the support plates 2 and 3 are positioned so as to be secured to one another, which socket when assembled is a negative form of the ball 1. The ball socket halves 17 and 18 are respectively shaped such that the widths thereof only begin to decrease into the support plates 2 and 3 from the opening cross sections that face one another in the assembled position. The ball socket halves 17 and 18 are furthermore dimensioned to cover a maximum of half of the ball 1. As a result, the ball 1 can be inserted into either of the ball socket halves 17 or 18 and the other ball socket half 17 or 18 subsequently placed thereon, without either of the parts having to be deformed for this purpose. The parts can therefore be as inflexible and rigid as is necessary for the mounting, without having to take assembly into consideration for this purpose.

Furthermore, the support plates 2 and 3 comprise, on two laterally opposite side faces thereof, set-back shoulders 21 and 22 which complement each other in the assembled position of the support plates 2 and 3 to form a groove 23. Right-angled recesses 24 are furthermore provided in the adapter plates 4 in the region of the first mounting points B1 and D1, which recesses, at the opposite lateral sides thereof, contain in each case a tongue 20 that projects into the recess 24, which tongues extend in parallel with the lateral edges of the recesses 24. The thickness and height of the tongue 20 are dimensioned in such a way that the support plates 2 and 3 in the assembled position, together with the groove 23, encompass the tongue 20 with little play, as a result of which the support plates 2 and 3 can be moved in parallel with the tongue 20. The length of the recess 24 in the direction of the tongue 20 is dimensioned so as to be longer than the length of the support plates 2 and 3 in that direction, meaning that the adapter plate 4 can move in the direction of the tongue 20. The tongue 20 and groove 23 joint is oriented in such a way that the adapter plate 4 can be moved transversely with respect to the first mounting points B1 and D1, and preferably perpendicularly with respect to the rail 6, as can also be seen by way of the arrows in FIG. 1.

In contrast, the recesses 24 in the second mounting points A1, A2, C1 and C2 are dimensioned such that the support plates 2 and 3 are supported immovably therein, and as a consequence thereof the adapter plates 4 cannot perform any transverse or longitudinal movements relative to the rail 6 at the second mounting points A1, A2, C1 and C2. However, the connections to the adapter plates 4 are also achieved at the second mounting points A1, A2, C1 and C2 by means of ball-and-socket joints 15, which are designed in an identical manner to the ball-and-socket joints 15 at the first mounting points B1 and D1. As a result, the rails 6 can also perform slight pivotal movements about the longitudinal axes thereof at the second mounting points A1, A2, C1 and C2, without constraining forces being generated at the second mounting points A1, A2, C1 and C2, in the rails 6 themselves, in the adapter plates 4 and finally also in the components to be secured thereon.

In order to assemble the securing device, the fitting parts 7 are initially inserted into the rails 6. The balls 1 having the securing screws 5 are then inserted into the ball socket halves 18 of the lower support plate 3 and screwed into the fitting parts 7. In a subsequent step, the adapter plate 4 is placed and oriented in such a way that it comes to rest, by means of the recess 24, on the support plate 3 or such that the support plate 3 extends into the recess 24 from below. In a final step, the upper support plate 2 is placed from above in such a way that it aligns the openings in the securing attachments 19 with the openings in the securing attachments 19 of the lower support plate and the ball socket half 17 covers the ball 1 from above. Finally, the two support plates forming the group are interconnected by screwing suitable securing screws into the securing attachments 19. The adapter plate 4 is therefore connected to the rail 6 at the mounting point by means of the interconnected support plates 2 and 3, the ball mounted in the ball socket 16 and by the fitting part 7, the advantageous pivotability being achieved by the ball 1.

After the securing is complete, the component is therefore supported on two adapter plates 4 which, for their part, are each supported at slidable first mounting points B1, D1 and at two non-slidable, or even fixed, second mounting points A1, A2, C1, C2. The adapter plates 4 can, on account of the ball-and-socket joints 15 provided therein, additionally pivot at each of the mounting points A1, A2, B1, C1, C2 and D1 within certain angles with respect to the rails 6 and vice versa. The adapter plates 4 can furthermore be decoupled from one another, i.e. no direct connection exists, apart from via the rails 6 and the component secured thereon, that would reinforce the floor structure.

Overall, by means of the proposed securing of the adapter plates 4, relative transverse movements of the rails 6 and pivotal movements of the rails 6, produced by deformation of the floor structure of the aircraft, are compensated, without the floor structure being deliberately reinforced, which has corresponding advantages for the components to be secured thereon, and for the occupant. Deformations of the floor structure are furthermore only limited, or ideally are not transferred to the adapter plate, the component and the occupant. In any case, the transfer of deformations and the reciprocal generation of constraining forces are considerably reduced by the proposed securing device, as a result of which requirements with respect to aviation regulations can be more easily complied with.

Figure 5:
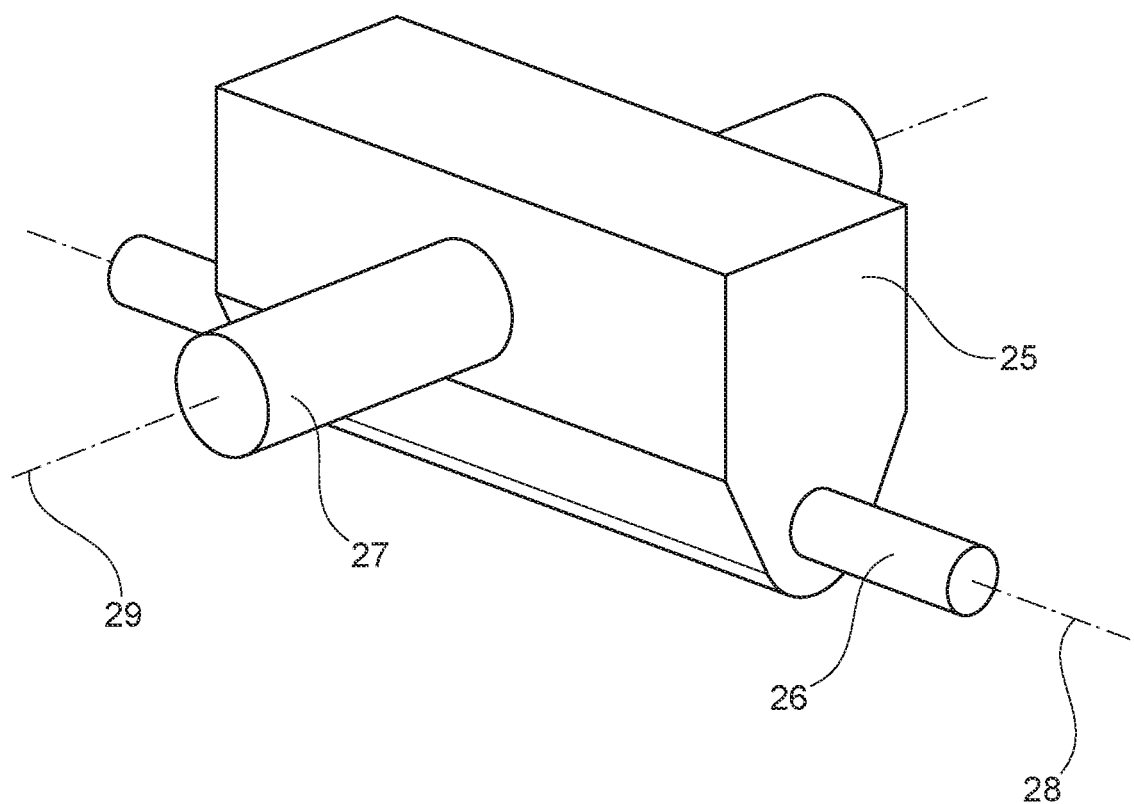
FIG. 5 shows an alternative coupling piece having two pivot pins.

FIG. 5 shows a coupling piece 25 that can be as used as an alternative to the ball-and-socket joints 15, which piece comprises two pairs of pivot pins 26 and 27 arranged in flush alignment. The coupling piece 25 is connected in this case to one of the adapter plates 4 by means of one of the pairs of pivot pins 26 or 27 and connected directly to the rails 6 or to an intermediate piece fixed with respect to the rails 6 by means of the other pair of pivot pins 26 or 27. The pivot pins 26 and 27 can in this case also be formed by one continuous, integral pivot pin 26 and 27, instead of by two pairs. The adapter plate 4 can be mounted so as to be pivotable at each mounting point A1, A2, B1, C1, C2 or D1 by means of the coupling piece 25 about the pivot axes 28 and 29 defined by the pivot pins 26 and 27, as a result of which a mounting can be achieved that is comparable in terms of properties with the ball-and-socket joints 15. For this purpose, the pivot pins 26 and 27 are preferably oriented orthogonally with respect to one another, such that the pivot axes 28 and 29 defined thereby are likewise oriented orthogonally with respect to one another. However, the use of the ball-and-socket joints 15 has the advantage that the mountings at the mounting points A1, A2, B1, C1, C2 and D1 are considerably flatter, meaning that correspondingly flat or thin adapter plates 4 can be used, and a correspondingly low overall height of the entire securing device can be achieved. The ball-and-socket joints 15 additionally have the advantage over the use of the coupling piece 25 together with the two pivot axes 28 and 29 that the balls 1 can be freely pivoted and rotated in the ball socket halves 17 and 18 within certain limits, whereas, when using the coupling pieces 25, movement of the adapter plates 4 is only produced by a combination of two pivotal movements about the two pivot axes 28 and 29.

Therefore, for reasons of overall height and of mobility, the use of ball-and-socket joints 15 is preferred.

Figure 6:
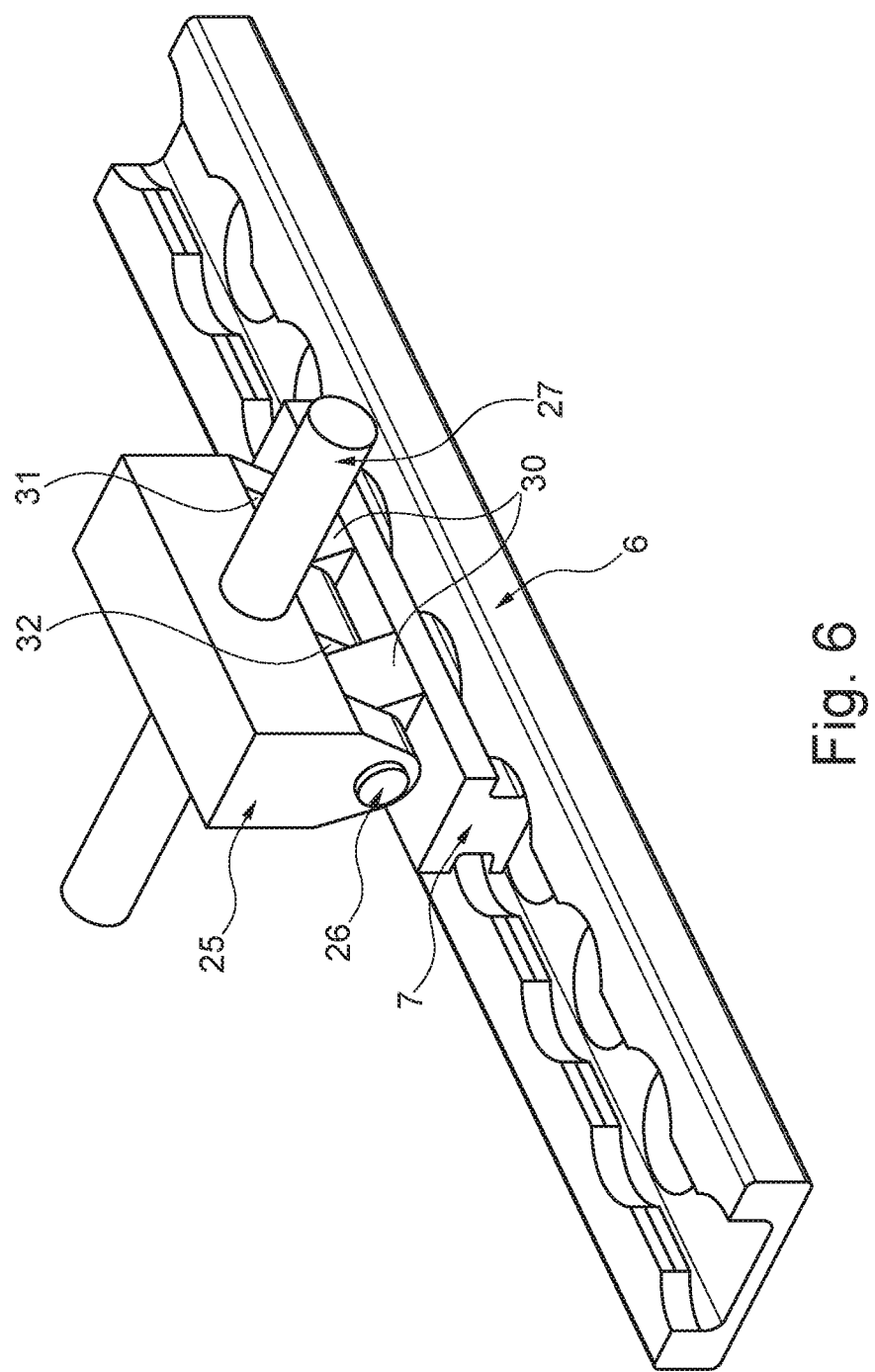
FIG. 6 shows a gimbal having the coupling piece from FIG. 5.

FIG. 6 shows the securing of the coupling piece 25 from FIG. 5 in a rail 6 by means of a fitting part 7. The coupling piece 25 comprises, on the lower side thereof, two cut-outs 31 and 32, by means of which the pivot pin 26 facing the rail 6 is exposed. Furthermore, the fitting part 7 comprises two upright domes 30 each having one through-opening. In order to assemble the coupling piece 25, the coupling piece is attached to the fitting part 7 such that the domes 30 engage in the cut-outs 31 and 32 and are oriented such that the through-openings in the domes 30 are flush with corresponding through-openings in the coupling piece 25. Subsequently, the pivot pin 26 is inserted through the flush openings of the coupling piece 25 and the openings in the domes 30, as a result of which the coupling piece 25 is pivotably connected to the fitting part 7 and the rail 6. The pivot pin 27 is oriented orthogonally with respect to the pivot pin 26, such that the component supported on the coupling piece 25 is mounted in the manner of a gimbal so as to be pivotable about the longitudinal axes of the pivot pins 26 and 27.

Accordingly, embodiments of the invention relate to a securing arrangement for a component that can be secured in rails 6 of a floor structure of an aircraft interior, at least two adaptor panels 4 being provided which are disconnected from one another, can be secured in the rails 6, and onto which the component can be secured using securing attachments that are spaced apart from one another.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A securing device configured to secure a single component on rails of a floor structure of an aircraft interior, the securing device comprising:
at least two adapter plates, which are decoupled from one another and configured to be secured on the rails, and configured to collectively secure the same component having mutually spaced securing attachments;
ball-and-socket joints, in each connection, configured to be between the component and the rails, each of the ball-and-socket joints comprising a dimensionally stable ball and a dimensionally stable ball socket, and the dimensionally stable ball socket of each of the ball-and-socket joints having two dimensionally stable ball socket halves,
wherein each of the adapter plates is configured to be secured to two different rails of the rails,
wherein each of the adapter plates is configured to be held in place on the rails at three mounting points such that each of the adapter plates is configured to be mounted on one of the rails at a first mounting point and on another rail at two second mounting points,
wherein each of the adapter plates is configured to be mounted on the rails so as to be slidable at the first mounting point,
wherein the dimensionally stable ball of each of the ball-and-socket joints is configured to be associated with at least one of the rails, and
wherein the dimensionally stable ball socket of each of the ball-and-socket joints is associated with at least one of the adapter plates,
wherein the two dimensionally stable ball socket halves of each of the ball-and-socket joints are formed by a respective first support plate and second support plate,
wherein, in an assembled position, the two dimensionally stable ball socket halves complement each other to form the dimensionally stable ball socket, each ball socket comprising a ball bore extending there-through in the vertical direction such that the ball is accepted therein, each ball of the ball and socket joint accepted into the ball bore has a fastener opening passing therethrough such that a fastener is fastened through the ball and into a receiving member, the receiving member being configured to be fastened within a respective rail such that the adapter plates are configured to be mounted on the rail through the ball and socket joint, wherein, for each of the ball-and-socket joints:
the first support plate and the second support plate in the assembled position are each connected by a tongue and groove joint to an adapter plate of the adapter plates, and
the tongue and groove joint is configured to be oriented transversely to the rails to which the adapter plate is configured to be secured, and
wherein faces of the first support plate and the second support plate, in the assembled position, are configured to abut vertically one on top of the other along two completely linear surfaces within a horizontal plane for the entire interface of the first and second support plates.

2. A securing system, the securing system comprising:
the securing device according to claim 1; and
a second securing device comprising at least two second adapter plates, which are configured to secure a second component to the rails,
wherein:
a side face of each of the adapter plates of the securing device is contoured such that it is configured to engage with a complementary side face of each of the corresponding second adapter plates of the second securing device;
in a condition where the adapter plates and the second adapter plates are arranged on a common rail, of the rails, and
in a condition where the side face and the complementary side face of pairs of the adapter plates and second adapter plates are arranged directly adjacent to one another on the common rail.

3. The securing system according to claim 2, wherein:
the side face of each of the adapter plates for securing the component has a negative contour configured to be complementary to a positive contour of the complementary side face of each of the corresponding second adapter plates for securing the second component in order for the side face and complementary side face of each of the pairs of the adapter plates and the second adapter plates to mutually engage with each other.

4. A securing system, the securing system comprising:
the securing device according to claim 1; and
a second securing device comprising at least two second adapter plates, which are configured to secure a second component to the rails, wherein:
each of the adapter plates and the second adapter plates are configured to be secured to two different rails of the rails,
each of the adapter plates and the second adapter plates are configured to be mounted on a first one of the rails at a respective first mounting point and on a second of the rails at two respective second mounting points,
the two respective second mounting points of each of the adapter plates and the second adapter plates are arranged on respective finger-shaped spaced apart projections, and
the respective first mounting point of each of the adapter plates and the second adapter plates are configured to be arranged on a respective individual finger-shaped projection, and
the respective first mounting point of each of the second adapter plates being configured to be supported on the first rail on the respective individual finger-shaped projection, which is arranged between the respective finger-shaped spaced apart projections of the two second mounting points of a respective one of the adapter plates.

5. The securing device according to claim 1, wherein
- a tongue of the tongue and groove joint is arranged on the adapter plate,
- a groove of the tongue and groove joint has two shoulders that complement each other in the assembled position to form the groove, and
- each of the two shoulders being arranged on one of the first support plate or the second support plate.

6. The securing device according to claim 1, wherein the first support plate and the second support plate are supported on the adapter plate by two tongue and groove joints that are arranged on opposite lateral sides of the first support plate and the second support plate.

7. The securing device according to claim 6, wherein the opposite lateral sides extend in parallel with one another.

8. The securing device according to claim 1, wherein the ball-and-socket joints are configured to be in each connection between the adapter plates and the rails.

9. The securing device according to claim 1, wherein the tongue and groove joint is configured to be oriented perpendicularly to the rails to which the adapter plate is configured to be secured.

10. The securing device according to claim 1, wherein, for each of the ball and socket joints, in the assembled stated, the first support plate and second support plate circumferentially surround a lateral portion of the ball, with a portion of the ball extending beyond an opening in an outer face of the second support plate.

11. The securing device according to claim 1, wherein for each of the ball and socket joints, the first support plate has an inner facing surface that is shaped to form one of the ball socket halves and the second support plate has an inner facing surface that is shaped to form another one of the ball socket halves.

12. The securing device according to claim 1, wherein for each of the ball and socket joints, the ball socket halves are respectively shaped such that the widths thereof only begin to decrease into the first support plate and the second support plate from opening cross sections that face one another in the assembled state such that the ball is insertable into either of the ball socket halves prior to the other one of the ball socket halves being placed thereon in the assembled state without either of the parts having to be deformed.

13. A securing device configured to secure a single component on rails of a floor structure of an aircraft interior, the securing device comprising:
- at least two adapter plates, which are decoupled from one another and configured to be secured on the rails, and configured to collectively secure the same component having mutually spaced securing attachments;
- ball-and-socket joints, in each connection, configured to be between the component and the rails, each of the ball-and-socket joints comprising a dimensionally stable ball and a dimensionally stable ball socket, and the dimensionally stable ball socket of each of the ball-and-socket joints having two dimensionally stable ball socket halves,
- wherein each of the adapter plates is configured to be secured to two different rails of the rails,
- wherein each of the adapter plates is configured to be held in place on the rails at three mounting points such that each of the adapter plates is configured to be mounted on one of the rails at a first mounting point and on an other rail at two second mounting points,
- wherein each of the adapter plates is configured to be mounted on the rails so as to be slidable at the first mounting point,
- wherein the dimensionally stable ball of each of the ball-and-socket joints is configured to be associated with at least one of the rails, and
- wherein the dimensionally stable ball socket of each of the ball-and-socket joints is associated with at least one of the adapter plates,
- wherein the two dimensionally stable ball socket halves of each of the ball-and-socket joints are formed by a respective first support plate and second support plate, and
- wherein, in an assembled position, the two dimensionally stable ball socket halves complement each other to form the dimensionally stable ball socket and comprise at least one securing attachment,
- wherein, for each of the ball-and-socket joints:
  - the first support plate and the second support plate in the assembled position are each connected by a tongue and groove joint to an adapter plate of the adapter plates, and
  - the tongue and groove joint is configured to be oriented transversely to the rails to which the adapter plate is configured to be secured, and
- wherein for each of the ball and socket joints, in the assembled state, the first support plate is arranged vertically on top of the second support plate such that the first support plate and the second support plate meet along a horizontal plane for an entire interface of the first support plate with the second support plate, each of the first support plate and second support plate have a ball bore extending there-through in the vertical direction such that the ball of the ball and socket joint is accepted within the bore in a condition where the first support plate is arranged vertically on top of the second support plate, the ball of the ball and socket joint accepted into the ball bore has a fastener opening passing therethrough such that a fastener is fastened through the ball and into a receiving member, the fastener extending through the ball bore in each of the first support plate and second support plate, securing the first support plate to the second support plate such that the faces of the first support plate and the second support plate abut along the horizontal plane, and the receiving member being configured to be fastened within a rail such that the adapter plates are configured to be mounted on the rail through the ball and socket joint.

* * * * *